United States Patent
Chang et al.

(10) Patent No.: US 10,542,362 B2
(45) Date of Patent: Jan. 21, 2020

(54) DETECTING DEVICE

(71) Applicant: Tymphany Acoustic Technology (Huizhou) Co., Ltd., Huizhou, Guangdong Province (CN)

(72) Inventors: Chih-Hsien Chang, Huizhou (CN); Jun-Hong Dong, Huizhou (CN); Tsung-Yi Lin, Huizhou (CN)

(73) Assignee: TYMPHANY ACOUSTIC TECHNOLOGY (HUIZHOU) CO., LTD., Huizhou, Guangdong Province (CN)

( * ) Notice: Subject to any disclaimer, the term of this patent is extended or adjusted under 35 U.S.C. 154(b) by 0 days.

(21) Appl. No.: 16/404,256

(22) Filed: May 6, 2019

(65) Prior Publication Data

US 2019/0342681 A1   Nov. 7, 2019

(30) Foreign Application Priority Data

May 4, 2018   (CN) ..................... 2018 2 0656850 U

(51) Int. Cl.
*H04R 29/00* (2006.01)
*H04R 3/00* (2006.01)
*G06F 3/16* (2006.01)

(52) U.S. Cl.
CPC ........... *H04R 29/001* (2013.01); *G06F 3/165* (2013.01); *H04R 3/00* (2013.01); *H04R 2420/07* (2013.01)

(58) Field of Classification Search
CPC .... H04R 1/406; H04R 29/004; H04R 29/005; H04S 7/301
USPC ............................................ 381/56, 58, 122
See application file for complete search history.

(56) References Cited

U.S. PATENT DOCUMENTS 6,954,538 B2 * 10/2005 Shiraishi ................ H04S 7/301
                                                        381/105

* cited by examiner

*Primary Examiner* — George C Monikang
(74) *Attorney, Agent, or Firm* — Muncy, Geissler, Olds & Lowe, P.C.

(57) ABSTRACT

A detecting device includes a turntable, a rotating device, a sound generating device, and a processing device. The turntable has a first surface and a second surface opposite to the first surface, and the first surface is used to dispose a device to be tested. The rotating device is connected to the second surface of the turntable for driving to rotate the turntable. The sound generating device is used to emit a test audio toward the device to be tested. The processing device is connected to the rotating device and the sound generating device. Among them, the processing device controls a rotational speed of the rotating device to rotate the device to be tested, and controls the sound generating device to emit the test audio to the device to be tested such that the device to be tested may receive the test audio at different angles.

6 Claims, 3 Drawing Sheets

DETECTING DEVICE

CROSS REFERENCE TO RELATED APPLICATIONS

This application claims priority of Application No. CN 201820656850.0 filed in China on May 4, 2018 under 35 U.S.C. § 119, the entire contents of all of which are hereby incorporated by reference.

TECHNICAL FIELD

The present utility model relates to the technical field of acoustic detecting devices, in particular, to a detecting device for detecting a device to be tested having a sound receiving function.

BACKGROUND

Current smart speakers have a function of sound receiving with a microphone, and are used to receive voice commands from users in different environments. Therefore, how to test whether the smart speaker can reach the factory inspection standard at different sound receiving positions and angles is an important issue.

However, in the prior art, detecting the sound receiving function of the smart speaker at different positions and angles is usually performed by setting a plurality of artificial mouths in a plurality of fixed positions, and playing test audio in turn. However, the cost of the artificial mouth is expensive, and it takes more labor to adjust the position when it is necessary to change the fixed position.

Therefore, in the field of detecting a device to be tested having a sound receiving function, it is necessary to design a detection device capable of reducing the instrument and labor cost to improve the detection efficiency.

SUMMARY

In order to solve the above problems existing in the prior art, the present invention provides a detecting device with a turntable.

The detecting device of the present application comprises a turntable, a rotating device, a sound generating device, and a processing device. The turntable has a first surface and a second surface, wherein the first surface is opposite to the second surface, and the first surface is used to dispose a device to be tested. The rotating device is connected to the second surface of the turntable for driving to rotate the turntable. The sound generating device is used to emit a test audio toward the device to be tested. The processing device is connected to the rotating device and the sound generating device. Among them, the processing device controls a rotational speed of the rotating device to rotate the device to be tested, and controls the sound generating device to emit the test audio to the device to be tested such that the device to be tested may receive the test audio at different angles.

As a further description of the technical solution of the present invention, the turntable is a plate structure.

As a further description of the technical solution of the present invention, the sound generating device is disposed outside a vertical region of the turntable.

As a further description of the technical solution of the present invention, the test audio is an audio signal of a simulated human voice.

As a further description of the technical solution of the present invention, the detecting device further comprises a photo-sensing detector disposed at a position where the first surface may be detected for detecting an external brightness change of the device to be tested.

As a further description of the technical solution of the present utility model, the processing device may determine a detection result of the device to be tested according to a result detected by the photo-sensing detector.

In summary, the detecting device according to the present application may reduce the instrument cost and labor cost of the detecting process, thereby improving the testing efficiency.

Figure 1:
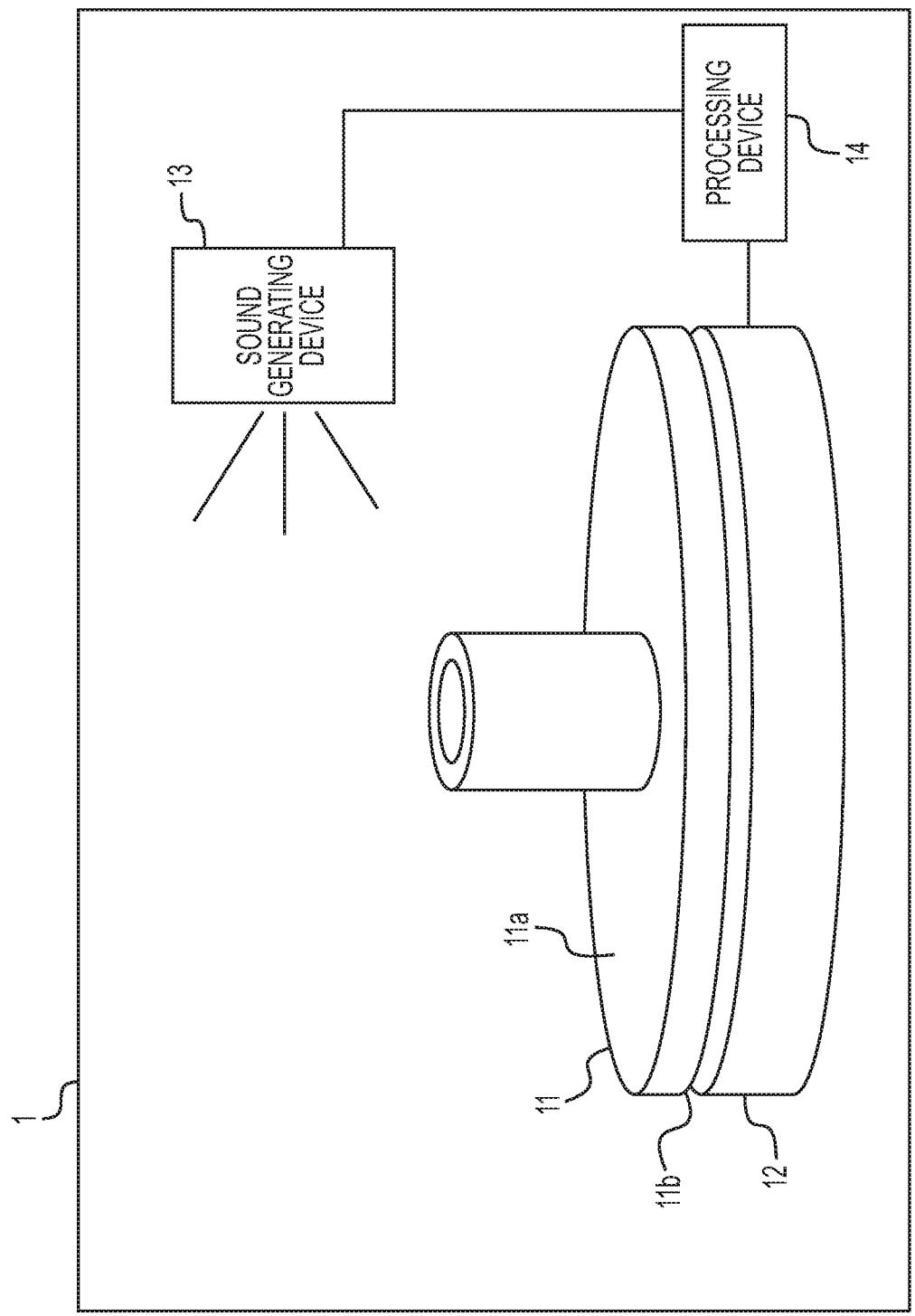
FIG. 1 is a structural view of an embodiment of a detecting device of the present invention.

Among those, the reference numerals are as follows:
1 detecting device
11 turntable
11a first surface
11b second surface
12 rotating device
13 sound generating device
14 processing device
15 photo-sensing detector

DETAILED DESCRIPTION

In order to facilitate understanding of the present utility model, the present invention will be described more fully hereinafter with reference to the accompanying drawings and specific embodiments. Preferred embodiments of the present invention are given in the drawings. However, the present invention may be embodied in many different forms and is not limited to the embodiments described herein. Rather, these embodiments are provided so that the disclosure of the present invention will be more fully understood.

It should be noted that when an element is referred to as being "fixed" to another element, it can be directly on the other element or a centered element can be present. When an element is considered to be "connected" to another element, it can be directly connected to a centered element can be present simultaneously.

For ease of reading, the terms "upper", "lower", "left", and "right" are used in the drawings to indicate the relative position of the reference between the elements, and not to limit the present application.

All technical and scientific terms used herein have the same meaning as commonly understood by one of ordinary skill in the art to which the present invention belongs, unless otherwise defined. The term used in the description of the present invention is for the purpose of describing specific embodiments and is not intended to limit the present invention.

Embodiment 1

With reference to FIG. 1, FIG. 1 shows a structural view of an embodiment of a detecting device 1. The detecting device 1 is configured to detect the sound receiving function of the device to be tested at different angles and positions, wherein the detecting device 1 comprises a turntable 11, a rotating device 12, a sound generating device 13, and a processing device 14. By way of example, the device to be tested may be an interactive equipment with speaker, for example a speaker, sound bar, smart phone, microphone, etc. The turntable 11 is a plate structure, and has a first surface 11a and a second surface 11b. The first surface 11a is configured to carry/support the device to be detected, wherein the device to be tested may be placed, locked or otherwise connected to the first surface 11a of the turntable 11. The shape of the turntable 11 may be, but not limited to, a rectangle, a circle, an ellipse, or other polygons, and in the embodiment, a circle is taken as an example. The rotating device 12 is disposed on the other surface of the turntable 11 with respect to the surface where the device to be tested is disposed, that is, the second surface 11b, and is in contact with the second surface 11b to drive the rotating turntable 11, so as to further rotate the device to be tested disposed on the first surface 11a, wherein the rotating device 12 may include a motor (not shown) and a rotating assembly (not shown), and the motor is rotated by an external power source to drive the rotating assembly connected to the second surface 11b to rotate the turntable 11 of the device to be tested.

The sound generating device 13 is disposed at a position adjacent to the device to be tested, and sends a test audio Stest to the device to be tested, wherein the sound generating device may be, but is not limited to, a speaker unit or other electronic product having a speaker unit. In addition, in other embodiments, since the device to be tested may also be disposed at a non-center position of the turntable 11, the sound generating device 13 is disposed outside the vertical region of the turntable 11 to avoid collision with the rotating device to be tested. The processing device 14 is an electronic device having computing power, and more specifically, a microcontroller having computing power. The processing device 14 is performed with the rotating device 12 and the sound generating device 13, respectively. The controller sets and controls the rotation speed of the rotating device 12 and the test audio Stest emitted by the sound generating device 13 through the processing device 14, so that the device to be tested may receive the test audio at different angles.

Figure 2:
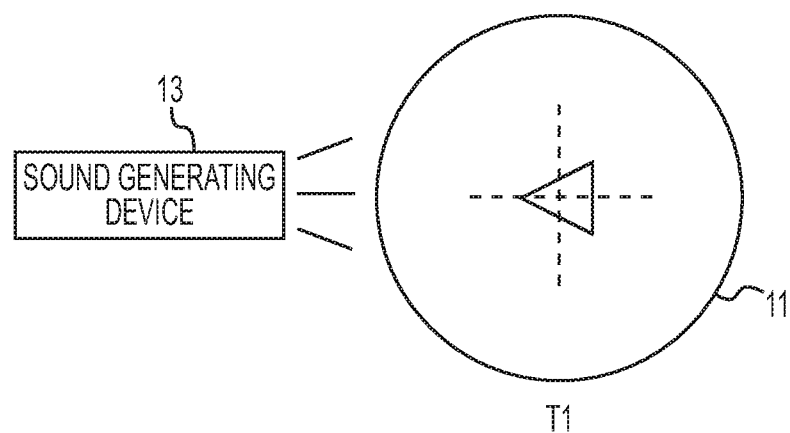
FIG. 2 is an assembly view of an embodiment of a detecting device of the present invention.
Figure 2:
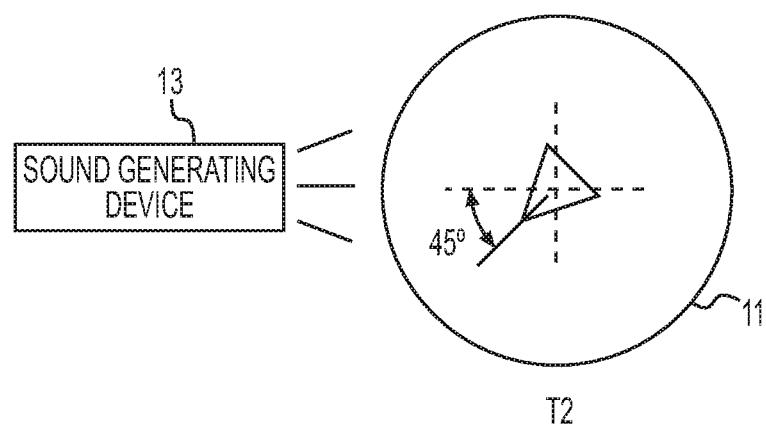
Figure 2:
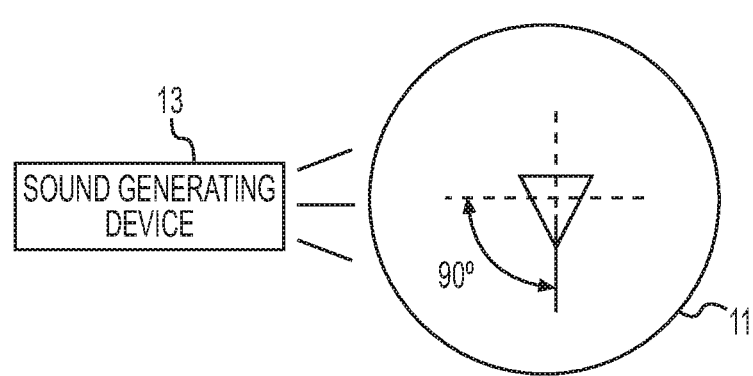

FIG. 2 shows an assembly view of an embodiment of a detecting device 1. In the present embodiment, the controller may set the sound generating device 13 to output the test audio Stest at the first time T1 by the processing device 14, at which time the turntable 11 is at the initial position; when at the second time T2, the processing device 14 controls the rotating device 12 to rotate the turntable 11 by 45 degrees in the counterclockwise direction, at which time the sound generating device 13 re-emits the test audio Stest; when at the third time T3, the rotating device 12 rotates the turntable 11 by 45 degrees in the counterclockwise direction, and rotates it to a position that is 90 degrees apart from the initial position, at which time the sound generating device 13 re-emits the test audio Stest.

Therefore, in the present embodiment, the user may control the rotating device 12 and the sound generating device 13 through the processing device 14, thereby achieving the purpose of detecting the sound receiving function of the device to be tested at different angles and positions.

In addition, in different embodiments, the rotation mode driven by the rotating device 12 may be, but not limited to, the following two types. One is that the turntable 11 is continuously driven at a constant speed or a non-equal speed between the first time T1 and the second time T2, so that the turntable 11 may reach the position set by the controller at the second time T2, which is a position after rotating 45 degrees counterclockwise in the present embodiment. The other is that the turntable 11 is instantaneously driven at a constant speed or a non-equal speed when at the second time T2 so that the turntable 11 may reach the position set by the controller at the second time T2, which is a position after rotating 45 degrees counterclockwise in the present embodiment.

Embodiment 2

Figure 3:
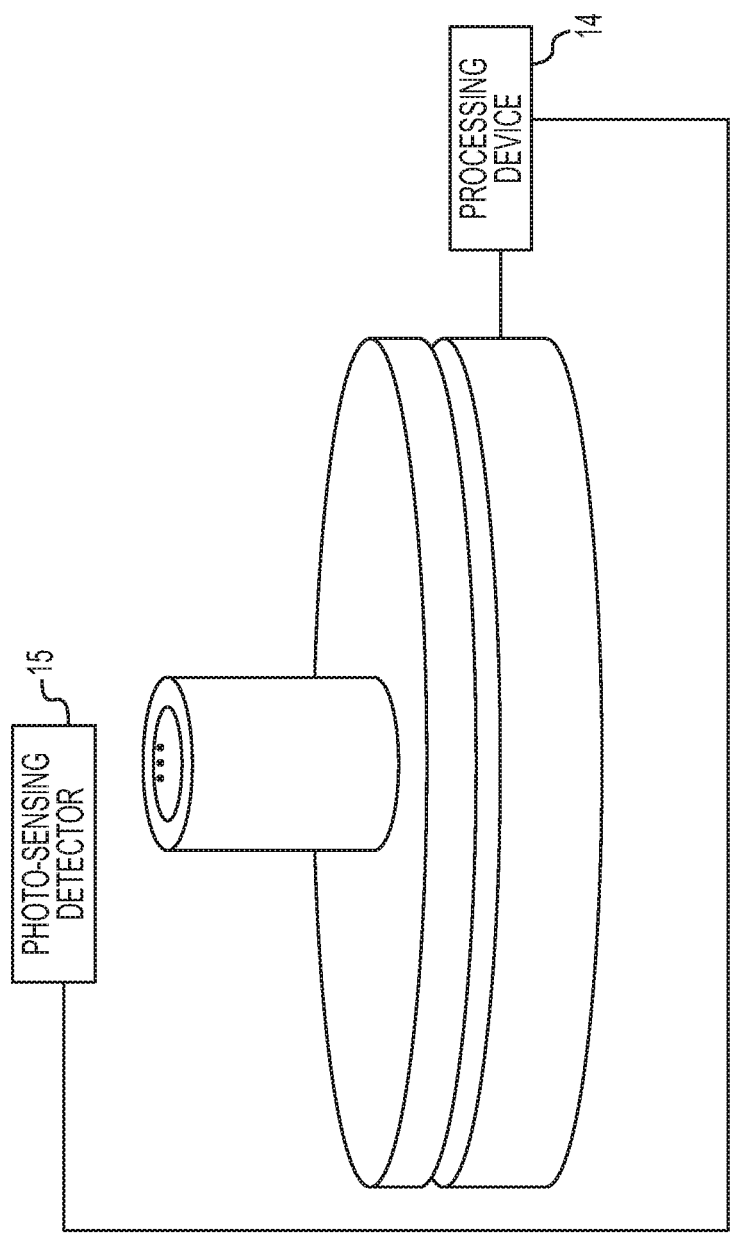
FIG. 3 is an assembly view of another embodiment in FIG. 1.

FIG. 3 shows an assembly view of another embodiment of a detecting device 1 of the present application. Compared with FIG. 1, the detecting device 1 of the present embodiment further comprises a photo-sensing detector 15. Since some of the devices to be tested may express the result of the sound receiving function through the external brightness variation, the detecting device 1 of the present embodiment may detect the external brightness of the device to be tested through the photo-sensing detector 15, and further directly obtain the detection result.

Among them, the photo sensor may be, but not limited to, a photosensitive component, a camera or other electronic device having an image sensing function. The external brightness variation of the device to be tested may be, but is not limited to, achieved by an LED or other electronic device having a brightness variation function.

In summary, the detecting device according to the present application may effectively perform detection for sound receiving function at many angles and positions in a low-cost but high-efficiency manner, and in some embodiments, the detection result may be more effectively obtained by the photo-sensing detector.

The above description is only examples and illustrative of the structure of the present utility model, and the description thereof is more specific and detailed, but is not to be construed as limiting the scope of the present utility model. It should be noted that it will be apparent to those skilled in the art that various modifications and improvements can be made without departing from the spirit and scope of the present utility model. These obvious alternatives are all within the scope of the present utility model.

The invention claimed is:

1. A detecting device for detecting a device to be tested having a sound receiving function, the detecting device comprising:
 a turntable having a first surface, configured to receive the device to be tested, and a second opposite to the first surface;
 a rotating device connected to the second surface configured to drive the turntable to rotate;
 a sound generating device configured to emit a test audio toward the device to be tested; and
 a processing device connected to the rotating device and the sound generating device;
 wherein the processing device controls a rotational speed of the rotating device to rotate the device to be tested, and controls the sound generating device to emit the test audio to the device to be tested such that the device to be tested may receive the test audio at different angles.

2. The detecting device according to claim 1, wherein the turntable is a plate structure.

3. The detecting device according to claim 1, wherein the sound generating device is disposed outside a vertical region of the turntable.

4. The detecting device according to claim 1, wherein the test audio is an audio signal of a simulated human voice.

5. The detecting device according to claim 1, further comprising a photo-sensing detector disposed at a position where the first surface may be detected for detecting an external brightness change of the device to be tested.

6. The detecting device according to claim 5, wherein the processing device is configured to determine a detection result of the device to be tested according to a result detected by the photo-sensing detector.

* * * * *